(12) United States Patent
Kambhatla et al.

(10) Patent No.: US 8,527,262 B2
(45) Date of Patent: Sep. 3, 2013

(54) SYSTEMS AND METHODS FOR AUTOMATIC SEMANTIC ROLE LABELING OF HIGH MORPHOLOGICAL TEXT FOR NATURAL LANGUAGE PROCESSING APPLICATIONS

(75) Inventors: Nandakishore Kambhatla, Karnataka (IN); Imed Zitouni, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/767,104

(22) Filed: Jun. 22, 2007

(65) Prior Publication Data
US 2008/0319735 A1 Dec. 25, 2008

(51) Int. Cl.
*G06F 17/28* (2006.01)

(52) U.S. Cl.
USPC ........ 704/9; 704/6; 704/5; 704/270; 704/260; 704/257; 704/2; 704/10; 704/1; 434/322; 715/255; 706/50; 706/45; 706/12

(58) Field of Classification Search
USPC .................. 704/9, 260, 6, 5, 270, 257, 2, 10, 704/1; 434/322; 715/255; 706/50, 45, 12
See application file for complete search history.

(56) References Cited

U.S. PATENT DOCUMENTS

| | | | | |
|---|---|---|---|---|
| 4,964,044 A * | 10/1990 | Kumano et al. | | 704/6 |
| 5,099,425 A * | 3/1992 | Kanno et al. | | 704/9 |
| 5,299,125 A * | 3/1994 | Baker et al. | | 704/9 |
| 5,640,501 A * | 6/1997 | Turpin | | 715/224 |
| 5,680,511 A * | 10/1997 | Baker et al. | | 704/257 |
| 5,835,888 A * | 11/1998 | Kanevsky et al. | | 704/9 |
| 5,875,334 A * | 2/1999 | Chow et al. | | 717/141 |
| 5,995,922 A * | 11/1999 | Penteroudakis et al. | | 704/9 |
| 6,067,520 A * | 5/2000 | Lee | | 704/270 |
| 6,292,771 B1 * | 9/2001 | Haug et al. | | 704/9 |
| 6,415,250 B1 * | 7/2002 | van den Akker | | 704/9 |
| 6,477,488 B1 * | 11/2002 | Bellegarda | | 704/9 |
| 6,594,783 B1 * | 7/2003 | Dollin et al. | | 714/38 |
| 6,823,325 B1 * | 11/2004 | Davies et al. | | 706/50 |
| 7,024,399 B2 * | 4/2006 | Sumner et al. | | 706/45 |
| 7,080,062 B1 * | 7/2006 | Leung et al. | | 1/1 |
| 7,421,386 B2 * | 9/2008 | Powell et al. | | 704/10 |
| 7,475,015 B2 * | 1/2009 | Epstein et al. | | 704/257 |
| 7,526,424 B2 * | 4/2009 | Corston-Oliver et al. | | 704/9 |
| 8,214,196 B2 * | 7/2012 | Yamada et al. | | 704/2 |
| 8,296,127 B2 * | 10/2012 | Marcu et al. | | 704/5 |
| 8,412,645 B2 * | 4/2013 | Ramaswamy et al. | | 706/12 |
| 2001/0014899 A1 * | 8/2001 | Fujikawa | | 707/513 |
| 2002/0152202 A1 * | 10/2002 | Perro et al. | | 707/3 |
| 2002/0164006 A1 * | 11/2002 | Weiss | | 379/201.01 |
| 2002/0198810 A1 * | 12/2002 | Roger | | 705/36 |
| 2003/0018469 A1 * | 1/2003 | Humphreys et al. | | 704/9 |

(Continued)

*Primary Examiner* — Michael Colucci
(74) *Attorney, Agent, or Firm* — F. Chau & Associates, LLC; Anne V. Dougherty, Esq.

(57) ABSTRACT

Systems and methods are provided for automated semantic role labeling for languages having complex morphology. In one aspect, a method for processing natural language text includes receiving as input a natural language text sentence comprising a sequence of white-space delimited words including inflicted words that are formed of morphemes including a stem and one or more affixes, identifying a target verb as a stem of an inflicted word in the text sentence, grouping morphemes from one or more inflicted words with the same syntactic role into constituents, and predicting a semantic role of a constituent for the target verb.

17 Claims, 6 Drawing Sheets

(56) References Cited

U.S. PATENT DOCUMENTS

| | | | |
|---|---|---|---|
| 2003/0033284 A1* | 2/2003 | Warren et al. | 707/1 |
| 2003/0036912 A1* | 2/2003 | Sobotta et al. | 705/1 |
| 2003/0055754 A1* | 3/2003 | Sullivan | 705/31 |
| 2003/0061022 A1* | 3/2003 | Reinders | 704/2 |
| 2003/0182102 A1* | 9/2003 | Corston-Oliver et al. | 704/9 |
| 2003/0182631 A1* | 9/2003 | Tsochantaridis et al. | 715/531 |
| 2004/0078271 A1* | 4/2004 | Morano et al. | 705/19 |
| 2004/0230415 A1* | 11/2004 | Riezler et al. | 704/5 |
| 2005/0192807 A1* | 9/2005 | Emam et al. | 704/260 |
| 2006/0116860 A1* | 6/2006 | Kaplan et al. | 704/1 |
| 2006/0204945 A1* | 9/2006 | Masuichi et al. | 434/322 |
| 2006/0212859 A1* | 9/2006 | Parker et al. | 717/143 |
| 2006/0235689 A1* | 10/2006 | Sugihara et al. | 704/257 |
| 2009/0076795 A1* | 3/2009 | Bangalore et al. | 704/9 |

* cited by examiner

300

لو عادَ السّادَةُ النُّوّابُ إلى الَّذينَ إِنْتَخَبُوهُم مِن مُخْتَلِفِ المَناطِقِ والطوائِفِ لوَجَدُوا إِجْماعاً شَعْبِيّاً عَلى هذا الاتِّجاهِ . "

301

لو عادَ السّادَةُ النُّوّابُ إلى الَّذينَ إِنْتَخَبُو- -هُم مِن مُخْتَلِفِ المَناطِقِ وَ- -الطوائِفِ لَ- وَجَدُوا إِجْماعاً شَعْبِيّاً عَلى هذا الاتِّجاهِ

SYSTEMS AND METHODS FOR AUTOMATIC SEMANTIC ROLE LABELING OF HIGH MORPHOLOGICAL TEXT FOR NATURAL LANGUAGE PROCESSING APPLICATIONS

TECHNICAL FIELD

The present invention relates generally to systems and methods for automated natural language processing and, in particular, systems and methods for automated semantic role labeling for natural language processing of languages having complex morphology.

BACKGROUND

In general, natural language processing systems implement various techniques to analyze a natural language text sentence to achieve some level of machine understanding of text input. For example, natural language processing applications typically employ automated morphological, syntactic, and semantic analysis techniques to extract and process grammatical/linguistic features of a natural langue text sentence based on rules that define the grammar of the target language A grammar of a given language defines rules that govern the structure of words (morphology), rules that govern the structure of sentences (syntax) and rules that govern the meanings of words and sentences (semantics).

More specifically, morphological rules of grammar are rules that define the syntactic roles, or POS (parts of speech), that a word may have such as noun, verb, adjective etc. In addition, morphological rules dictate the manner in which words can be modified by adding affixes (i.e., prefixes or suffixes) to generate different, related words. For example, a word can have one of several possible inflections within a given POS category, where each inflection marks a distinct use such as gender, number, tense, person, mood or voice.

The syntax rules of grammar govern proper sentence structure, i.e., the correct sequences of the syntactic categories (POSs). Syntactic analysis is a process by which syntax rules of grammar are used to combine the words of an input text sentence into phrases and combine the phrases (constituents) into a complete sentence. Syntactic analysis is typically performed by constructing one or more hierarchical trees called syntax parse trees. For instance, FIG. 6A depicts an exemplary syntax parse tree for the English language sentence "The man broke the glass" and FIG. 6B depicts an exemplary syntax parse tree for the English language sentence "The man with black hair broke the glass". Each syntax parse tree includes leaf nodes that represent each word of the input sentence, a single root node (S) that represents the complete sentence, and intermediate-level nodes, such as NP (noun phrase), VP (verb phrase), PP (prepositional phrase) nodes, etc, between the root and leaf nodes, which are hierarchically arranged and connected based on the syntax rules of grammar.

The Semantics rules of grammar govern the meanings of words and sentences. Semantic analysis is a process by which semantic rules are used to identify the "semantic roles" of a particular syntactic category within the sentence. For example, "subjects" are generally assigned the role of "who" (agent, actor, doer, or cause of the action, and the like), direct objects are assigned the role of "what" (patient, affected, done-to, or effect of the action, and the like), and modifiers can have a variety of roles such as source, goal, time, and the like. Semantic role labeling (SRL) generally refers to a process of assigning appropriate semantic roles to the arguments of a verb, where for a target verb in a sentence, the goal is to identify constituents that are arguments of the verb and then assign appropriate semantic roles to the verb arguments. In linguistics, the "arguments" of a verb are those phrases that are needed in a clause (sentence) to make the clause semantically complete. For example, the verb "give" requires three arguments (i) a giver (ii) a taker, and (iii) an object given. In the English text sentence "John gave the book to Mary", the verb arguments are (i) John (the giver); (ii) Mary (the taker) and (iii) the book (the object given).

Semantic role information of sentence constituents is a crucial component in natural language processing (NLP) and natural language understanding (NLU) applications in which semantic parsing of sentences is needed to understand the grammatical relations between the arguments of natural language predicates and resolve syntactic ambiguity. Indeed, the ability to recognize and label semantic arguments is a key task for answering "Who", "When", "What", "Where", "Why", etc., questions in applications such as machine translation, information extraction, natural language generation, question answering, text summarization, etc., which require some form of semantic interpretation.

In general, conventional SRL systems were configured to extract semantic features and assign semantic roles by analyzing the syntactic structure of sentences output from a syntactic parser or other shallow parsing systems trained using syntactic constituent data. The syntactic annotation of a parsed corpus makes it possible to properly identify the subjects and objects of verbs in sentences because certain semantic roles tend to be realized by certain syntactic categories and verb-argument structures. For instance, in the syntax parse tree of FIG. 6A, semantic analysis may identify the noun man as the "subject" of the verb broke and identify "the glass" as the object of the verb broke.

However, conventional methods of semantic role labeling based on pure syntactic parsing are problematic and not capable of representing the full meaning of sentence. These problems are due to the fact there can be significant variation in syntactic structure of arguments of predicates in a language such as English. In other words, one predicate may be used with different argument structures and one semantic representation may represent different syntactic derivations of surface syntax. In short, the difficulty in identifying semantic roles is because there is no direct mapping between syntax and semantics.

By way of example, consider the following sentences (1) "John broke the window" and (2) "The window broke". A syntactic analysis will represent "the window" as the direct object of the verb "broke" in sentence (1) and will represent "the window" as the subject in sentence (2). In this regard, the syntactic analysis would not indicate that the window plays the same underlying semantic role of the verb broke in both sentences. Note that both sentences (1) and (2) are in the active voice, and that this alternation between transitive and intransitive uses of the verb does not always occur.

For example, consider the following sentences: (3) "The sergeant played taps" and (4) "The sergeant played". In sentences (3) and (4), the subject "sergeant" has the same semantic role of the verb "played" in both instances. However, the same verb "played" can also undergo syntactic alternation, as in the following sentence: (5) "Taps played quietly in the background". Moreover, the role of the verb's direct object can differ even in transitive uses, such as in the following example sentences: (6) "The sergeant played taps" and (7) "The sergeant played a beat-up old bugle." This alternation in the syntactic realization of semantic arguments is widespread, affecting most verbs in some way, and the patterns exhibited by specific verbs vary widely.

In this regard, while the syntactic annotation of any parsed corpus makes it possible in some instances to identify the subjects and objects of verbs in sentences such as the above examples, or while the parsed corpus may provide semantic function tags such as temporal and locative for certain constituents (generally syntactic adjuncts), the parsed corpus does not necessarily distinguish the different roles played by a verb's grammatical subject or object in the above examples. Again, this is because the same verb used with the same syntactic sub-categorization can assign different semantic roles. As such, semantic role labeling is difficult using pure syntactic parsers as these parsers are not capable of representing the full, deep semantic meaning of sentence.

Recently, semantic role labeling systems have been implemented using supervised machine learning techniques to train syntactic parsers using a corpus of words annotated with semantic role labels for each verb argument. For instance, the well-known Proposition Bank project provides a human-annotated corpus of semantic verb-argument relations, where for each verb appearing in the corpus, a set of semantic roles is defined for purposes of providing task independent semantic representations that are independent of the given application. With this annotated corpus, the possible labels of arguments are core argument labels ARG [0-5] and modifier argument labels such as ARGM-LOC and ARGM-TMP, for location and temporal modifiers, respectively.

As an example, the entry specific roles for the verb offer are given as:
Arg0 entity offering
Arg1 commodity
Arg2 price
Arg3 benefactive or entity offered to The roles are then annotated for every instance of the verb appearing in the corpus, including the following examples:

[ARG0 the company] to offer [ARG1 a 15% to 20% stake] [ARG2 to the public];

[ARG0 Sotheby's] . . . offered [ARG2 the Dorrance heirs] [ARG1 a money-back guarantee];

[ARG1 an amendment] offered by [ARG0 Rep. Peter DeFazio]; and

[ARG2 Subcontractors] will be offered [ARG1 a settlement].

A variety of additional roles are assumed to apply across all verbs. These secondary roles can be considered as adjuncts, rather than arguments. The secondary roles include: Location, Time, Manner, Direction, Cause, Discourse, Extent, Purpose, Negation, Modal, and Adverbial, which are represented in PropBank as "ArgM" with an additional function tag, for example ArgM-TMP for temporal.

A set of roles corresponding to a distinct usage of a verb is called a roleset, and can be associated with a set of syntactic frames indicating allowable syntactic variations in the expression of that set of roles. The roleset with its associated frames is called a Frameset. A polysemous verb may have more than one Frameset, when the differences in meaning are distinct enough to require different sets of roles, one for each Frameset. This lexical resource provides a consistent argument labels across different syntactic realizations of the same verb. For example, in the following sentences:

[$_{ARG0}$ John] broke [ARG1 the window]
[$_{ARG1}$ The window] broke, the arguments of the verbs are labeled as numbered arguments: Arg0 and Arg1, and so on according to their specific roles despite the different syntactic positions of the labeled phrases (words between brackets). In particular, in the above example, it is recognized that each argument plays the same role (as indicated by the numbered label Arg) in the meaning of the particular sense of the verb broke. These phrases are called "constituents" of semantic roles. In this example, the constituent [the window] is recognized as the verb's object in both sentences.

In the following example sentence, "Mr. Bush met him privately, in the White House, on Thursday", functional tags are assigned to all modifiers of the verb "met", such as manner (MNR), locative (LOC), temporal (TMP):

Rel: met
Arg0: Mr. Bush
Arg1: him
ArgM-MNR: privately
ArgM-LOC: in the White House
ArgM-TMP: on Thursday Recently, techniques have been proposed for automatic semantic role labeling on English and Chinese texts using parsers trained on a corpus of manually annotated semantic roles labels. For English language text, the input to the SRL system is a sequence of white-space delimited words, where each verb is presented by a white-space delimited word and a constituent is presented as a sequence of white-space delimited words, and where punctuations and special characters are assumed to be separated from the words. The proposed SRL systems are configured to predict a semantic role label for each white-space delimited verb and each constituent (sequence of white space delimited words). For Chinese text sentences, the proposed SRL systems are configured to process the input text sentence at the character level.

The ability to implement automated semantic role labeling systems for languages with high morphology such as Hebrew, Maltese, German, Arabic, etc., is highly problematic. For instance, Arabic is a Semitic language with rich templatic morphology where an Arabic word may be composed of a stem (consisting of a consonantal root and a template), or a stem plus one or more affixes (prefix or suffix) attached to the beginning and/or end of the stem. These affixes include inflectional markers for tense, gender, and/or number, as well as prepositions, conjunctions, determiners, possessive pronouns and pronouns, for example. In this regard, Arabic white-space delimited words may be composed of zero or more prefixes, followed by a stem and zero or more suffixes.

This complex morphology of Arabic and other languages present challenges with respect to natural language processing applications, and SRL approaches employed for English and Chinese texts, which process input text at the word or character level, are not necessarily extendable to such complex morphological languages. Indeed, since Arabic white-space delimited words, for example, may be composed multiple prefixes, a stem, and multiple suffixes, important morphologic information can be missed if Arabic text is processed at the word or character level such as for English and Chinese, resulting in poor performance.

SUMMARY OF THE INVENTION

Exemplary embodiments of the invention generally include systems and methods systems and methods for automated semantic role labeling for languages having complex morphology. In one exemplary embodiment of the invention, a method for processing natural language text includes receiving as input a natural language text sentence comprising a sequence of white-space delimited words including inflicted words that are formed of morphemes including a stem and one or more affixes, identifying a target verb as a stem of an inflicted word in the text sentence, grouping morphemes from one or more inflicted words with the same syntactic role into constituents, and predicting a semantic role of a constituent for the target verb.

In another exemplary embodiment of the invention, a method for processing natural language text includes receiving as input a natural language text sentence comprising a sequence of white-space delimited words including at least one inflicted word comprising a stem and one or more affixes, automatically segmenting the white-space delimited words into separate morphemes including prefixes, stems and suffixe, automatically grouping morphemes into constituents and identifying morphemes that are target verbs, and automatically predicting a semantic role of a constituent for a target verb using a trained statistical model.

In yet another exemplary embodiment of the invention, a method for processing natural language text includes receiving as input a natural language text sentence comprising a sequence of white-space delimited words including at least one inflicted word comprising a stem and one or more affixes, automatically performing a morphological analysis on the text sentence as a sequence of characters to extract morphological information, automatically detecting stems of inflicted words that are target verbs and grouping stems and affixes of different words into constituent, using the extracted morphological information, and automatically predicting a semantic role of each constituent for a target verb using a trained statistical model using a plurality of feature data including morphological features extracted during morphological analysis.

These and other embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
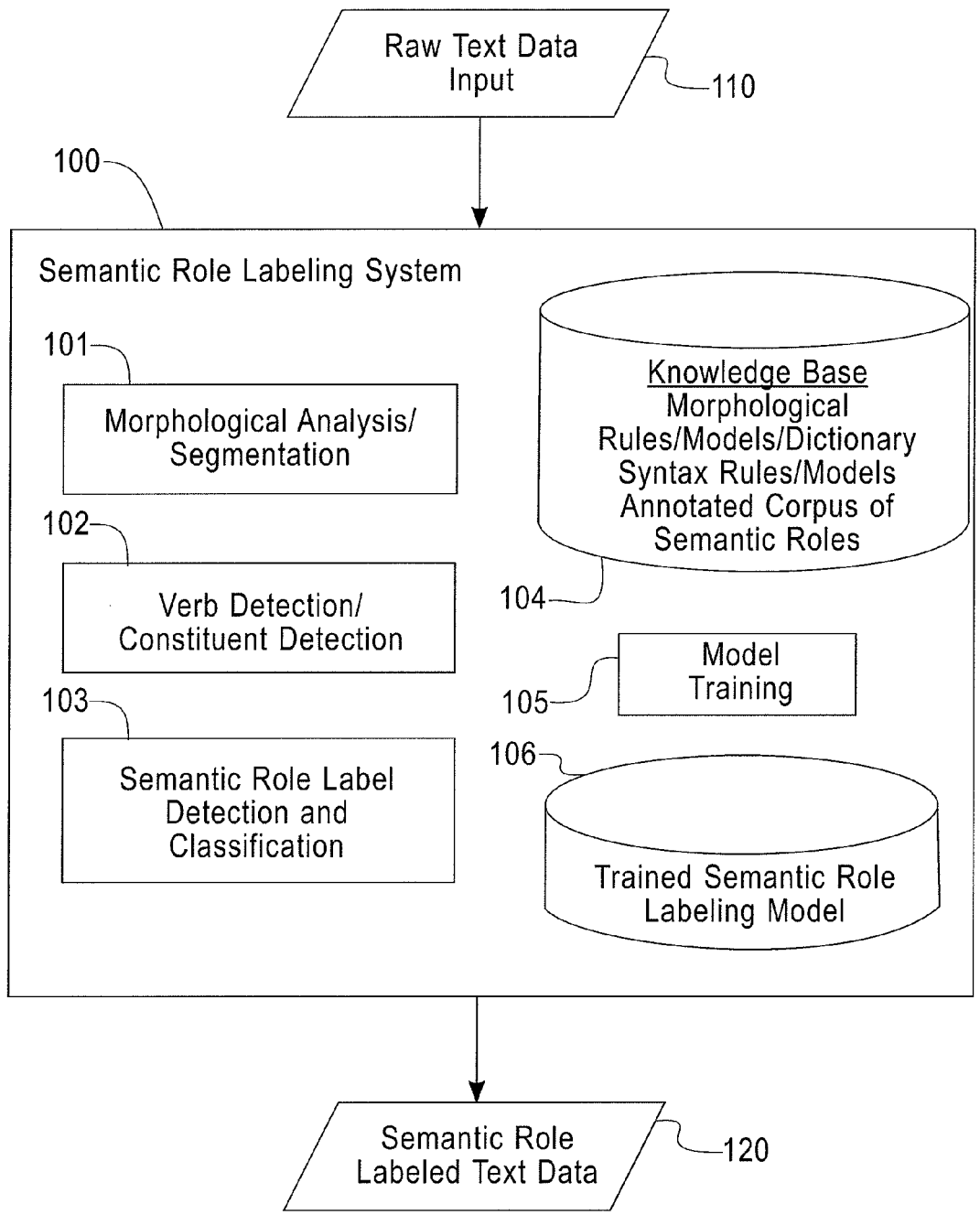
FIG. 1 is a high-level block diagram of a system for automatic semantic role labeling of natural language sentences for languages with complex morphology, according to an exemplary embodiment of the invention.

FIG. 1 is a block diagram of a semantic role labeling system according to an exemplary embodiment of the invention. In general, FIG. 1 illustrates an exemplary architecture of an automated semantic role labeling (SRL) system (100) comprising various components such as a morphological analysis/segmentation module (101), a verb detection/constituent detection module (102), a semantic role labeling classification module (103), a knowledge base repository (104), an SRL model training module (105) and an SRL model repository (106), to provide an integrated computational framework that supports automated semantic role labeling for natural language processing applications targeted for languages with complex morphology. The SRL system (100) may be implemented as part of an automatic natural language processing system (e.g., machine translation, information extraction, NLG, question answering, text summarization, etc.), wherein the SRL system (100) is employed to process input text data (110) to identify verb-argument structures in input sentences, predict the semantic roles for verb arguments, and output semantic role labeled textual data (120) in any suitable format that enables machine understanding of the natural language text input for the given application. The raw text data (110) input to the SRL system (100) may be the recognition result of a user input (e.g., speech input, handwriting input, etc.) to a front-end machine recognition system (e.g., speech recognition system, handwriting recognition system, etc.) for example, where the textual data stream (recognition results) are input to the SRL system (100) for semantic parsing and interpretation. In other embodiments, the raw text input (110) may be text input from a keyboard or memory or any other input source, depending on the application.

The morphological analysis/segmentation module (101), verb detection/ constituent detection module (102) and semantic role labeling classifier module (103) implement morphological, syntactic, and semantic processing functions to extract various lexical/syntactical features that are processed by the SRL system (100) to identify and classify verb arguments in input text sentences for languages with high morphology. The knowledge base repository (104) includes diverse sources of information and knowledge, which is used by the model builder (105) to build/train a SRL model (106) during a training phase. The SRL model (106) is used by the SLR classifier module (103) during a decoding phase to make identification and classification decisions with regard to semantic role labeling of verb arguments within input text sentences using various lexical/syntactic features and other information extracted during the decoding process. The knowledge base repository (104) includes data structures, rules, models, configuration files, etc., that are used by the various processing modules (101), (102) and (103) to perform morphological, syntactic, and semantic analysis on input text to thereby extract the lexical features and information that is used for semantic role identification and annotation.

The SRL system (100) is trained to identify and classify semantic roles of verb arguments within input text sentences using a SRL model that is configured to make identification and classification decisions regarding an utterance in accordance with an aggregate of a plurality of information sources. The model building module (105) may implement one or more machine-learning and/or model-based methods to construct an SRL model (106) that is used by the processing module (103) during a decoding phase to make decisions for semantic role labeling of input text sentences over a set of lexical and syntactic feature data. In one exemplary embodiment, a statistical SRL model can be trained using various machine learning techniques such as maximum entropy modeling, voted perceptron, support vector machines, boosting, statistical decision trees, and/or combinations thereof.

Figure 2A:
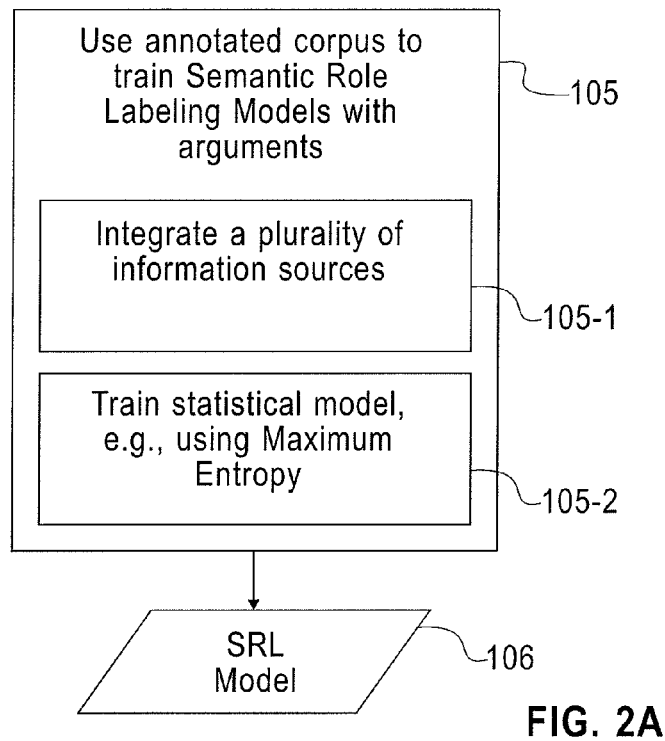
FIGS. 2A and 2B schematically illustrate systems and methods for training a statistical semantic role labeling model according to an exemplary embodiment of the invention.
Figure 2B:
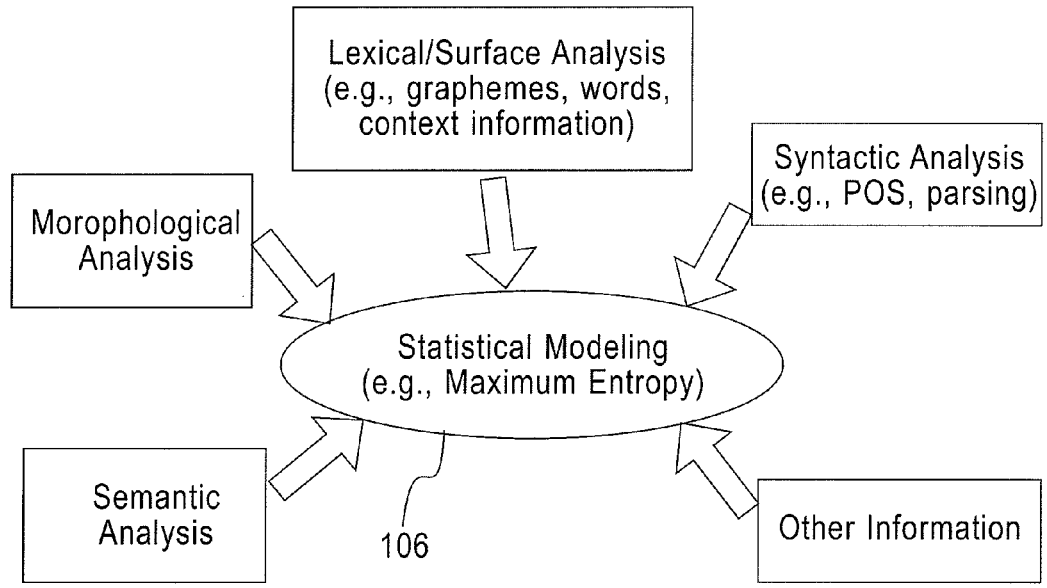

FIGS. 2A and 2B schematically illustrate systems and methods for training a semantic role labeling model according to an exemplary embodiment of the invention. As noted above, the semantic role labeling model (106) is configured to make identification and classification decisions regarding an utterance in accordance with an aggregate of a plurality of information sources. FIG. 2A is a block diagram that illustrates the various functions and methodologies that may be implemented by the model training module (105) in FIG. 1 to train the statistical semantic role labeling system (100), according to an exemplary embodiment of the invention. FIG. 2B illustrates various sources of information that may be used to train and decode the statistical semantic role labeling system (100), according to an exemplary embodiment of the invention.

In one exemplary embodiment of the invention, as illustrated in FIG. 2A, a model building process implemented by the model trainer (105) is generally based on the use of a large human-annotated corpus of semantic verb-argument relations (such as the ProBank annotation) to train a statistical model (106), together with other sources of syntactic and lexical features that are integrated into the statistical model (105_1). In one exemplary embodiment of the invention, a classification SRL model (106) for the argument identification and classification processes is trained using a maximum entropy approach (105_2) using a large real corpus annotated with argument structures and other relevant features, where good performance in a natural language processing applications can be achieved by integrating diverse sources of information or features.

In accordance with exemplary embodiments of the invention, various model building techniques capable of integrating and making selective use of diverse input types may be implemented for automated SRL processing. In one preferred exemplary embodiment discussed below, a Maximum Entropy classification model is used to integrate arbitrary types of information and make a classification decision by aggregating all information available for a given classification. Maximum Entropy has many advantages over rule based methods of the prior art. For example, Maximum Entropy permits the use of many information sources and provides flexibility and accuracy needed for changing dynamic language models. The Maximum Entropy method is a flexible statistical modeling framework that has been used widely in many areas of natural language processing. Maximum entropy modeling produces a probability model that is as uniform as possible while matching empirical feature expectations, which can be interpreted as making as few assumptions as possible in the model.

Within the maximum entropy framework, any type of feature can be used, enabling a system designer to experiment with different feature types. Maximum entropy modeling permits combinations of multiple overlapping information sources. The information sources may be combined as follows:

$$P(o \mid h) = \frac{e^{\sum_i \lambda_i f_i(o,h)}}{\sum_{o'} e^{\sum_j \lambda_j f_j(o',h)}}$$

This equation describes the probability of a particular outcome (o) (e.g., one of the arguments) given a pair (verb, constituent), and the context. $\lambda_i$ is a weighting function or constant used to place a level of importance on the information being considered for the feature. Note that the denominator includes a sum over all possible outcomes (o'), which is essentially a normalization factor for probabilities to sum to 1. The indicator functions or features fi are activated when certain outcomes are generated for certain context.

$$f_i(o \mid h) = \begin{cases} 1, & \text{if } o = o_i \text{ and } q_i(h) = 1 \\ 0, & \text{otherwise} \end{cases}$$

where $o_i$ is the outcome associated feature $f_i$ and $q_i(h)$ is an indicator function for histories. The maximum entropy models may be trained using improved iterative scaling, which is known in the art.

FIG. 2B schematically illustrates various sources/features that may be integrated into an SRL model (106) using Maximum Entropy modeling, where information or features extracted from these sources are used to train a Maximum Entropy model. The multiple sources of information in statistical modeling may include, e.g., a lexical or surface analysis. This may include the analyzing strings or sequences of characters, morphemes or words. Another source may include syntactic analysis information. This looks to the patterned relations that govern the way the words in a sentence come together, the meaning of the words in context, parts of speech, information from parse tree, etc. Semantic analysis looks to the meaning of (parts of) words, phrases, sentences, and texts. Morphological analysis may explore all the possible solutions to a multi-dimensional, non-quantified problem. For example, identification of a word stem from a full word form (e.g., morphemes). In addition, any other information may be employed which is helpful in training statistical models for SRL classification.

The model builder process (105) may use data in the knowledge base (104) to train classification models, and possibly dynamically update previously trained classification models that are implemented by the classification process (103). In one exemplary embodiment of the invention, the model builder (105) may be implemented "off-line" for building/training a classification model that learns to provide proper SRL identification and classification assessments, or the model builder process (105) may employ "continuous" learning methods that can use domain knowledge in repository (104) which is updated with additional learned data derived from newly SRL annotated textual data generated by (or input to) the SRL system (100). Advantageously, a continuous learning functionality adds to the robustness of the SRL system (100) by enabling the classification process (103) to continually evolve and improve over time without costly human intervention.

In one exemplary embodiment of the invention, a decoding phase of the SRL system (100) includes various sub-tasks to process an input text sentence, including, (i) segmenting the text into morphemes or tokens via processing module (101), (ii) detecting target verbs and grouping tokens into constituents via processing module (102), and (iii) for given a target verb and a constituent, predicting the verb's arguments, including NONE (no-argument), via processing module (103). This last step is a classification process implemented by the processing module (103), wherein the SRL model (106) is used to attribute a semantic role label, or NONE, if the constituent does not fill any role. These various sub-tasks may employ various types and combinations of lingusitc computational methodologies depending on the application.

An exemplary mode of operation of the SRL system (100) will now be discussed with regard to exemplary operating modes and architectures for implementing the processing stages (101), (102) and (103) for automated semantic role labeling of language with high morphology such as Arabic. For illustrative purposes, an exemplary operating mode of the processing stages will be described in the context of processing a sample Arabic text input sentence as depicted in FIG.

3A, wherein the input sentence (300) is a sequence of white-space delimited words that are written from left to right. Moreover, the SRL system (100) is assumed to be adapted to determine verb-argument structures and predict semantic labels for given input-sentences using the set of semantic roles as defined by PropBank as discussed above, including those roles traditionally viewed as arguments and as adjuncts.

In the first decoding stage of the SRL system (100), the morphological analysis/segmentation module (101) receives the raw text input (110) and segments words into tokens or morphemes. The morphological analysis/segmentation module (101) will segment white-space delimited words into (hypothesized) prefixes, stems, and suffixes, which may then become the subjects of analysis for further processing of the text. In this manner, verbs and pronouns can be processed as separate tokens. This segmenting process enables a surface word form into its component derivational and inflectional morphemes.

Figure 3A:
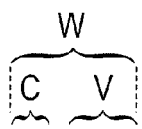
FIGS. 3A and 3B illustrate a method for segmenting an Arabic text sentence into morphemes, according to an exemplary embodiment of the invention.

FIG. 3A illustrates an input sentence in Arabic text, where a target verb إنتخب (V) and constituent هم (C) are part of the same word إنتخبوهم (W) (where constituent هم (C) has a role of Arg1 and is a suffix). The English translation for the Arabic text sentence in FIG. 3A is: "if parliament members returned to those they elected them from different regions and counties they will found popular agreement in this sense", where the phrase "elected them" is one-Arabic word (W), where "elected" is the verb (V) and "them" is a constituent (C). It is important to know that in the example of FIG. 3A, the target verb and one of its constituent are part of the same white-space delimited word إنتخبوهم, where the verb and constituent are a sequence of characters in the white-space delimited word ( إنتخبوهم ).

Figure 3B:
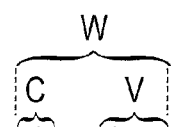

FIG. 3B illustrates a segmented text sentence (301) that is generated by performing segmentation on the input ext sentence (300) of FIG. 3A. FIG. 3B is the Arabic segmented text sentence (301) where the original white-space delimited Arabic word (W) is segmented into separate "tokens" including the verb (V) token إنتخب and the constituent (C) token هم . The character "–" is used in the segmented sentence (301) to mark the separation of the tokens in the original white-space delimited word (W). FIG. 3B illustrates a "light segmentation" process in which the input text is segmented into tokens by segmenting stems and affixes for the semantic role labeling task. In other exemplary embodiments, the input text sentence can be segmented into more detailed morphemes (e.g., POS segmentation) with POS tags which can then be grouped together to form lighter segmentation as features that are used for semantic role labeling.

It is to be noted that the morphological/segmentation processes can be performed using known techniques adapted for the target language. For instance, segmentation can be implemented using machine learning techniques such as FST (finite state transducer) or Maximum Entropy to train the model on a corpus of training date already segmented using a plurality of information sources, wherein the trained model can then be used to segment new raw text.

The segmentation process provides important morphological feature data that enables increased accuracy in the SRL process. This is in contrast to conventional methods for processing English text, as noted above, where the SRL process will first detect target verb (a white-space delimited word) and then determine constituents (sequence of white-space delimited words) with their correct arguments. This approach is not particularly applicable for high morphology languages as it will not allow detection of the verb إنتخب nor the constituent هم in the exemplary sentence of FIG. 3A. Moreover, if a character based approach is used such as the Chinese SRL methodology, important morphological information such as pronouns, etc., can be missed, therefore resulting in poor performance.

It is to be noted that the initial segmentation process is an optional process. In other exemplary embodiments, high morphological text such as Arabic text can be processed on a character level (rather than word level) in instances where morphological information is integrated into the SRL model during training and decoding. In other words, the segmentation process is not needed where morphological analysis is performed as a character level using morphological information during the classification process (discussed below).

Figure 4A:
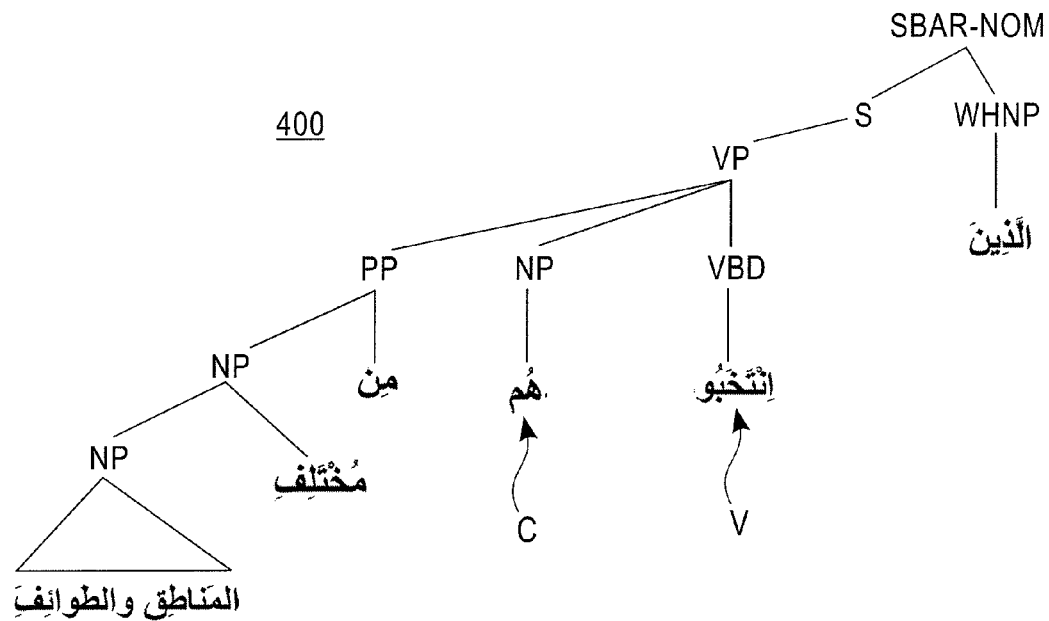
FIGS. 4A and 4B are exemplary parse tree diagrams that illustrate results of syntactic parsing and annotation of semantic role labeling for the exemplary segmented text of FIG. 3B.

In the next stage of processing, the verb detection and parsing/constituent detection module (102) receives as input the segmented text (sequence of tokens), and groups the segmented text into constituents, where sequences of tokens that have the same role are grouped together—indicated by the label (argument). In one exemplary embodiment, the constituents are formed by building a parse tree, where each node in the tree is a constituent. FIG. 4A is an exemplary diagram of a parse tree (400) of a portion of the sentence of FIG. 3B which illustrates the use of the parse to group a portion of the tokens in FIG. 3B into constituents (nodes in the tree) using PropBank constituent labels. FIG. 4A illustrates Penn Tree-Bank Constituent labels, including, for example, NP (noun phrase), PP (prepositional phrase), VP (Verb Phrase), VBD (Verb, past tense) (POS tag), SBAR (clause introduced by complementizer), WHNP (Wh-noun Phrase), etc. This process can be implemented using known statistical parsing approaches. In one embodiment, a statistical model based on maximum entropy and a plurality of information sources can be used to build a reasonably accurate parser.

In the next stage of processing, the SRL classifier (103) receives the parse tree as input and processed the target verbs and constituents (e.g., node in the parse tree). For each pair (verb, constituent), the semantic role labeling classifier (103) predicts the argument of the verb, including NONE if there is no argument (i.e., constituent does not fill any role). This process is a classification process in which the classification module (103) uses the trained statistical SRL model (106) as well as the input utterance (text) and other relevant features to compute for each pair (verb, constituent) the likelihood of each possible semantic role label (argument) for the given verb and context. The argument with highest score (probability) may be assigned, or the N-best arguments may be assigned and subjected to further post processings steps to eventually select the most probable and best argment assignment. In another exemplary embodiment of the invention, binary classification process may first be used to detect or otherwise identify whether a candidate constituent is an argument or not, and then predict the argument's number (among set of arguments) if the candidate is identified as an argument.

Figure 4B:
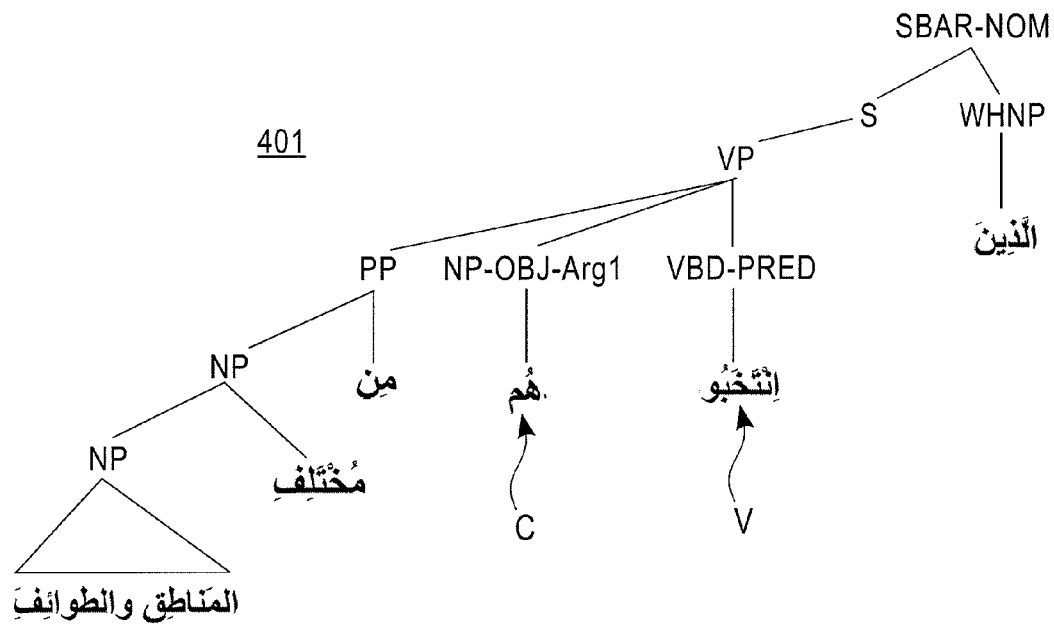

FIG. 4B is an exemplary Arabic parse tree with Semantic Role Annotations which is generated as a result of SRL classification of the parse tree of FIG. 4A. In FIG. 4B, for the target verb/predicate إنتخب (VBD-PRED node), the semantic role label Arg1 attributes to the constituent (they) هم (NP-OBJ node), of those elected, resulting in the node NP-OBJ-Arg1.

Figure 5:
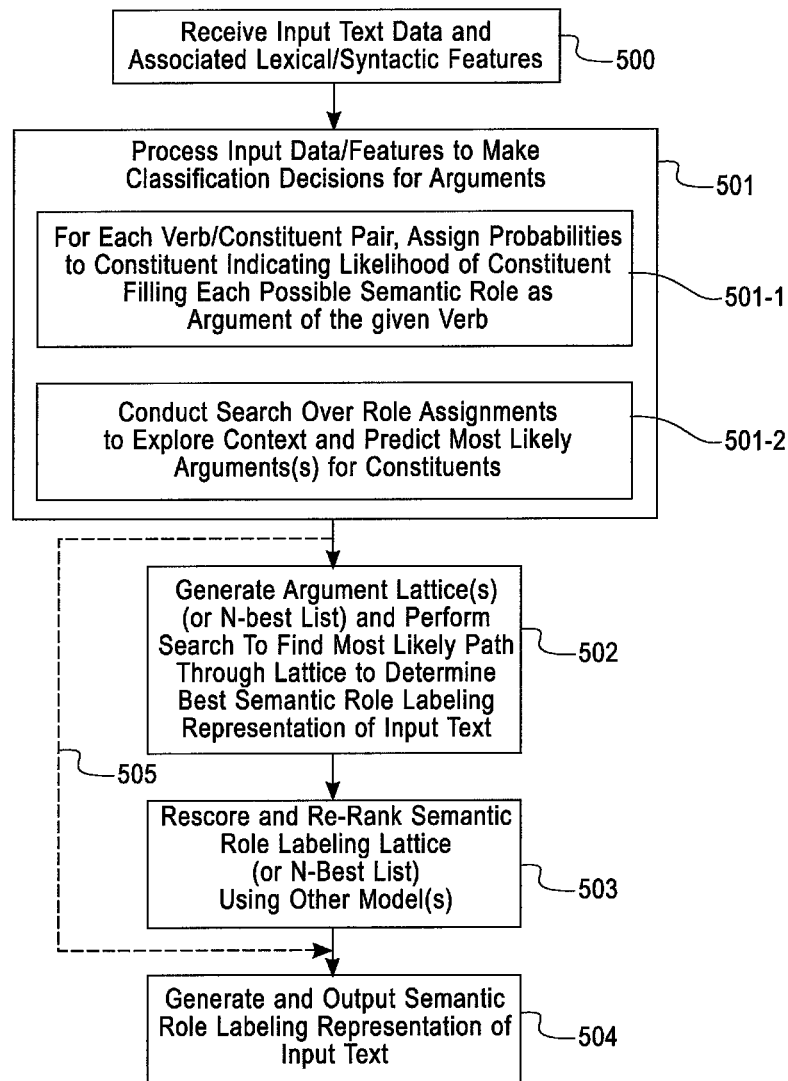
FIG. 5 is a block diagram that illustrates a system and method for semantic role classification of verb arguments for languages with complex morphology, according to an exemplary embodiment of the invention.
Figure 6A:
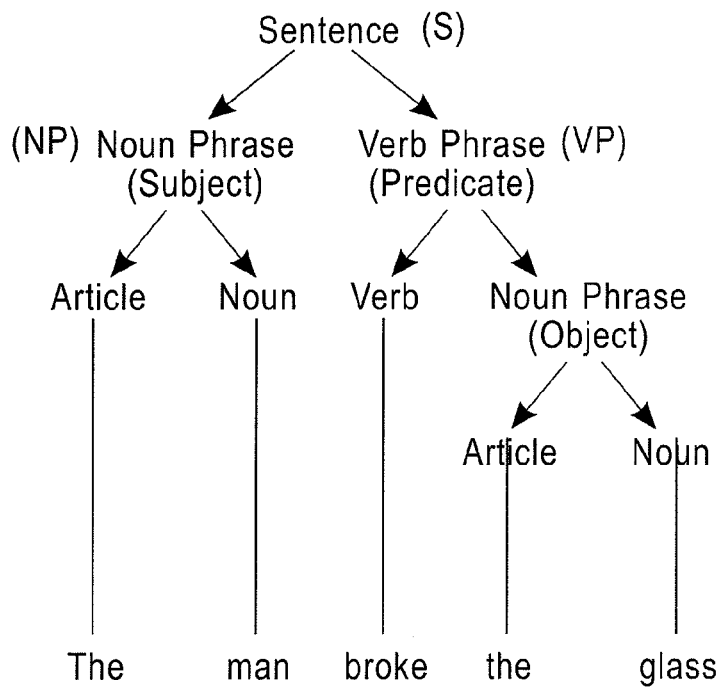
FIGS. 6A and 6B are exemplary syntactic parse trees of English text sentences generated using conventional syntactic analysis methods.
Figure 6B:
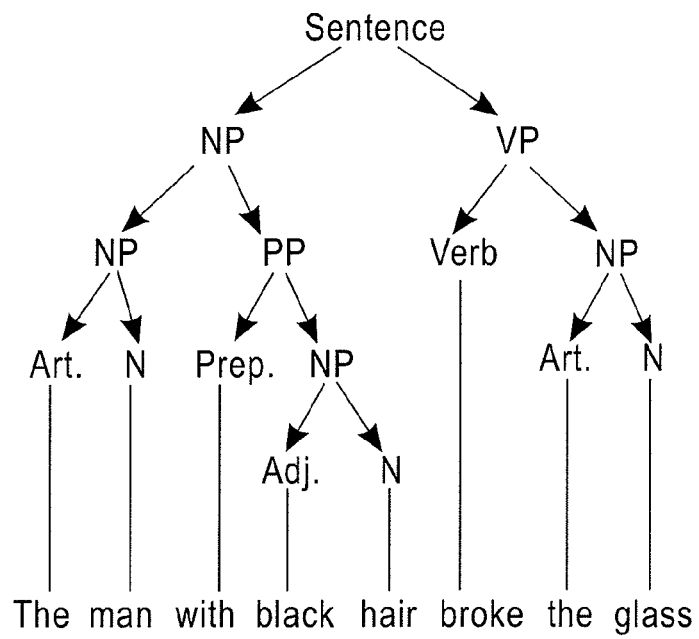

It is to be understood that various techniques may be used to implement SRL classification in the processing stage (103) of FIG. 1. For instance, FIG. 5 is a flow diagram of a semantic role labeling classification method according to an exemplary embodiment of the invention. FIG. 5 illustrates an exemplary process flow which may be implemented by the SRL classification module (103) in FIG. 1 during a decoding phase in which the SRL classifier (103) uses the trained SRL model to determine whether the constituents in an input sentence represent semantic arguments of a given verb and assign appropriate argument labels to those constituents, including NONE (no-argument) labels for those constituents that do not correspond to a semantic argument of the given verb.

Referring to FIG. 5, the SRL classification module (103) receives as input raw text data and other associated syntactic/lexical features that were extracted during prior processing stages (step 500). For example, the input data can include raw text along with labels/tags for segmented text, parse tree features, target verb labels, constituent labels, and other diverse sources of information, similar to those feature computed to train the SRL model. Indeed, as discussed above, the input text may be subjected to various decoding stages (e.g., processing stages 101, and 102 in FIG. 1) to obtain lexical/grammatical features that were used to train the SRL model. As noted above, the types of features that may be used for classification will vary.

The SRL classification module (103) will process the input data/features using the trained SRL model, which is trained to make identification and classification decisions regarding role assignments for constituents over a plurality of input features (step (501)). In particular, the SRL classification module (103) processes this input text and associated features using the trained SRL model to predict argument roles and determine the highest probable role assignment(s) for all constituents of a given verb in the sentence, given the set of features of each constituent in the parse tree. This classification process (step 501) process may be implemented in various ways.

For instance, as depicted in FIG. 5, the process (step 501) may be implemented to include sub-processes (501_1) and (501_2). In particular, during a decoding process, the classifier module will use the SRL model and input data/features to compute/estimate for each verb/constituent pair, a set or distribution of probabilities that indicate how likely the given constituent fills a semantic role as an argument of the given verb for all possible semantic roles of the verb, given the set of features processed by the SRL model (step 501_1). For instance, an SRL model can be based on a maximum entropy framework where the SRL model is trained to process the set of feature data for each verb/constituent pair to thereby assign probabilities to each possible argument, including a NONE or NULL label that indicates the constituent is not a semantic argument of the verb. The SRL model may be a maximum entropy model that is trained to output all possible semantic roles for a given verb/constituent pair.

While the SRL model is used to estimate probable semantic role assignments (assign probabilities to each argument), a search may be conducted over the role assignments to explore the context and predict the most likely argument(s) (step 501_2) using known techniques such as Viterbi searching or dynamic programming, etc. This process takes into consideration previous states and current observations to determine the next state probabilities to thereby ensure that the sequence of classifications produced by the SRL model are coherent.

The classification process (step 501) may be configured to produce different outputs depending on whether the classification results post-processing steps that may be implemented. For instance, the SRL classification process (501) may be configured to (i) output a set of N-best argument labels for each constituent of a given verb when post processing steps (502), 503 are employed or (ii) output the best argument label for each constituent of a given verb when no post processing steps are implemented. In particular, in one exemplary embodiment of the invention, the classification results (step 501) can be further processed using an n-best parse hypothesis process (step 502) and a re-scoring or re-ranking process (step 503) to enhance the accuracy of semantic role labeling of verb arguments.

In particular, for each parsed sentence, an argument lattice is generated using an N-best hypotheses analysis for each node in the syntax tree. Each of the N-best arguments for the given constituents are considered as potential argument candidates while performing a search through the argument lattice using argument sequence information to find the maximum likelihood path through the lattice (step 502). The argument labels for the best path or the N-best paths can be assigned.

An optional re-ranking and rescoring process (step 503) may be implemented to increase the accuracy of the semantic role labeling system. The process of re-ranking is to select the overall best solution from a pool of complete solutions (i.e., best path from a set of best paths (N-best paths) output from the N-best hypothesis process (step 502). Re-Ranking can integrate different types of information into a statistical Model, using maximum entropy or voted perceptron for example, to classify the N-best list. The predicted scores of the arguments are used as the input features to the re-ranking process. Other types of information can be input to the re-ranking method using well-known methods.

As a final step, a semantic role labeling representation of the input text is generated and output where for each sentence, the verb arguments are labeled according to the best semantic role determined via the classification process (step 504). For instance, the SRL representation may be a parse tree where each node in the parse tree has a semantic role label that represents a semantic role played by the verb argument or a Null label that indicates that the node does not correspond to a semantic argument of the verb. For instance, the arguments of a verb can be labeled ARG0 to ARG5, as core arguments, and possibly adjunctive arguments, ARGMs. If post processing steps (502) and (503) are not implemented (bypass flow (505)), the classification process (501) outputs the best argument label for each constituent of a given verb for a given sentence, which label is used to generate the SRL representation (step 504).

It is to be understood that the systems and methods described herein in accordance with the present invention may be implemented in various forms of hardware, software, firmware, special purpose processors, or a combination thereof. The present invention may be implemented in software as an application comprising program instructions that are tangibly embodied on one or more program storage devices (e.g., magnetic floppy disk, RAM, CD Rom, DVD, ROM and flash memory), and executable by any device or machine comprising a suitable architecture. It is to be further understood that because the constituent system modules and method steps depicted in the accompanying Figures may be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Although illustrative embodiments have been described herein with reference to the accompanying drawings, it is to be understood that the invention is not limited to the precise system and method embodiments described herein, and that various other changes and modifications may be affected therein by one skilled in the art without departing from the scope or spirit of the invention. All such changes and modifications are intended to be included within the scope of the invention as defined by the appended claims.

We claim:

1. A program storage device readable by machine, tangibly embodying a program of instructions executable by the machine to perform a method for processing natural language text, comprising:
   receiving as input a natural language text sentence comprising a sequence of white-space delimited words including inflicted words that are formed of morphemes including a stem and one or more affixes;
   automatically parsing the inflicted words into their constituent morphemes;
   grouping the parsed morphemes of the inflicted words with the same syntactic role into constituents;
   identifying a plurality of verb-constituent pairs in the text sentence;
   predicting potential arguments for each constituent of the grouped morphemes, wherein the constituents are associated with a verb by the verb-constituent pairs and each prediction is weighted for a respective argument and grouped morpheme being considered;
   assigning a probability to each of the potential arguments, wherein the probability indicates a probability that the potential argument applies to a respective constituent; and
   outputting a plurality of semantic roles for a given verb/constituent pair as the potential arguments with corresponding probabilities,
   wherein predicting potential arguments for each constituent of the grouped morphemes and assigning the probability to each of the potential arguments includes:
   performing lexical/surface analysis;
   performing morphological analysis;
   performing semantic analysis;
   performing syntactic analysis; and
   integrating results of the lexical/surface analysis, the morphological analysis, the semantic analysis, and the syntactic analysis into a statistical model based on Maximum Entropy to produce a probability model for predicting potential arguments for each constituent of the grouped morphemes and assigning the probability to each of the potential arguments.

2. The program storage device of claim 1, wherein automatically parsing the inflicted words using the trained classifiers comprising performing an automated morphological analysis using the one or more trained classifiers to segment the text sentence into a sequence of morphemes by separating stems and affixes of inflicted words.

3. The program storage device of claim 1, wherein predicting potential arguments is performed automatically using a semantic role labeling model that predicts semantic roles using a plurality of syntactic and lexical features extracted from the input text sentence.

4. The program storage device of claim 1, wherein identifying a target verb and grouping morphemes is performed using an automated syntactic parsing process to build a parse tree where each node in the parse tree is a constituent.

5. The program storage device of claim 4, wherein the automated syntactic parsing process is implemented using a parsing model trained on an annotated corpus of verb-argument structures.

6. The program storage device of claim 1, wherein the input text sentence is Arabic text.

7. A program storage device readable by machine, tangibly embodying a program of instructions executable by the machine to perform method steps for processing natural language text, the method steps comprising:
   receiving as input a natural language text sentence comprising a sequence of white-space delimited words including inflicted words that are formed of morphemes including a stem and one or more affixes;
   automatically parsing the inflicted words into their constituent morphemes;
   grouping the parsed morphemes of the inflicted words with the same syntactic role into constituents;
   identifying a plurality of verb-constituent pairs in the text sentence, wherein at least one verb-constituent pair is formed of respective morphemes of a same white-space delimited word;
   predicting potential arguments for each constituent of the grouped morphemes, wherein the constituents are associated with a verb by the verb-constituent pairs; and
   predicting a semantic role of each constituent of the grouped morphemes according to probabilities of the potential arguments,
   wherein predicting potential arguments for each constituent of the grouped morphemes and predicting the semantic role of each constituent of the grouped morphemes according to the probabilities of each of the potential arguments includes:
   performing lexical/surface analysis;
   performing morphological analysis;
   performing semantic analysis;
   performing syntactic analysis; and
   integrating results of the lexical/surface analysis, the morphological analysis, the semantic analysis, and the syntactic analysis into a statistical model based on Maximum Entropy to produce a probability model for predicting potential arguments for each constituent of the grouped morphemes and predicting the semantic role of each constituent of the grouped morphemes according to the probabilities of each of the potential arguments.

8. The program storage device of claim 7, further comprising instructions for performing an automated morphological analysis using the one or more trained classifiers to segment the text sentence into a sequence of morphemes by separating stems and affixes of inflicted words.

9. The program storage device of claim 7, wherein the instructions for predicting the semantic role of each constituent includes instructions for automatically predicting semantic roles using a semantic role labeling model using a plurality of syntactic and lexical features extracted from the input text sentence.

10. The program storage device of claim 7, wherein the instructions for identifying each verb-constituent pair and grouping the arguments comprise instructions for using an automated syntactic parsing process to build a parse tree where each node in the parse tree is a constituent.

11. The program storage device of claim 10, wherein the instructions for automated syntactic parsing process comprise instructions for using a parsing model trained on an annotated corpus of verb-argument structures.

12. The program storage device of claim 7, wherein the instructions for predicting potential arguments for each constituent, comprise instructions for:
   identifying a constituent that is an argument of the target verb; and
   assigning a semantic role to a constituent that is identified as an argument of the target verb.

13. The program storage device of claim 7, wherein the instructions for predicting potential arguments for each constituent, comprise instructions for:
- determining a likelihood of a semantic role of a constituent for the target verb over a set of possible semantic roles given the identified target verb; and
- assigning the constituent a semantic role label having the highest likelihood over the set of possible semantic roles.

14. The program storage device of claim 7, wherein the instructions for predicting potential arguments for each constituent, comprise instructions for using a statistical model trained to process a plurality of lexical and syntactic features.

15. The program storage device of claim 7, wherein the input text sentence is Arabic text.

16. A program storage device readable by machine, tangibly embodying a program of instructions executable by the machine to perform a method for processing natural language text, comprising:
- receiving as input a natural language text sentence comprising a sequence of white-space delimited words including at least one inflicted word comprising a stem and one or more affixes;
- automatically segmenting the white-space delimited words into separate morphemes by parsing the inflicted words into their constituent morphemes;
- automatically grouping the parsed morphemes into constituents and identifying morphemes that are target verbs; and
- automatically predicting a semantic role of each constituent for each target verb using a trained statistical model, wherein each prediction is associated with a probability; and
- selecting one of the constituents as an argument for each target verb according to the probabilities,
- wherein predicting the semantic role of each constituent and selecting one of the constituents includes:
  - performing lexical/surface analysis;
  - performing morphological analysis;
  - performing semantic analysis;
  - performing syntactic analysis; and
  - integrating results of the lexical/surface analysis, the morphological analysis, the semantic analysis, and the syntactic analysis into a statistical model based on Maximum Entropy to produce a probability model for predicting the semantic role of each constituent and selecting one of the constituents.

17. A program storage device readable by machine, tangibly embodying a program of instructions executable by the machine to perform a method for processing natural language text, comprising:
- receiving as input a natural language text sentence comprising a sequence of white-space delimited words including at least one inflicted word comprising a stem and one or more affixes;
- automatically parsing the inflicted words into their constituent morphemes;
- automatically detecting stems of inflicted words that are target verbs and grouping stems and affixes of different words into constituents, using morphological information derived from the automatic parsing;
- automatically predicting a semantic role of each constituent for a target verb using a trained statistical model using a plurality of feature data including morphological features extracted during morphological analysis, wherein each prediction is associated with a probability; and
- selecting one of the constituents as an argument for each target verb according to the probabilities,
- wherein predicting the semantic roll of each constituent and selecting one of the includes:
  - performing lexical/surface analysis;
  - performing morphological analysis;
  - performing semantic analysis;
  - performing syntactic analysis; and
  - integrating results of the lexical/surface analysis, the morphological analysis, the semantic analysis, and the syntactic analysis into a statistical model based on Maximum Entropy to produce a probability model for predicting the semantic role of each constituent and selecting one of the constituents.

* * * * *